O. E. KILMER.
BABY CARRIAGE.
APPLICATION FILED FEB. 28, 1921.
1,401,085. Patented Dec. 20, 1921.
2 SHEETS—SHEET 2.
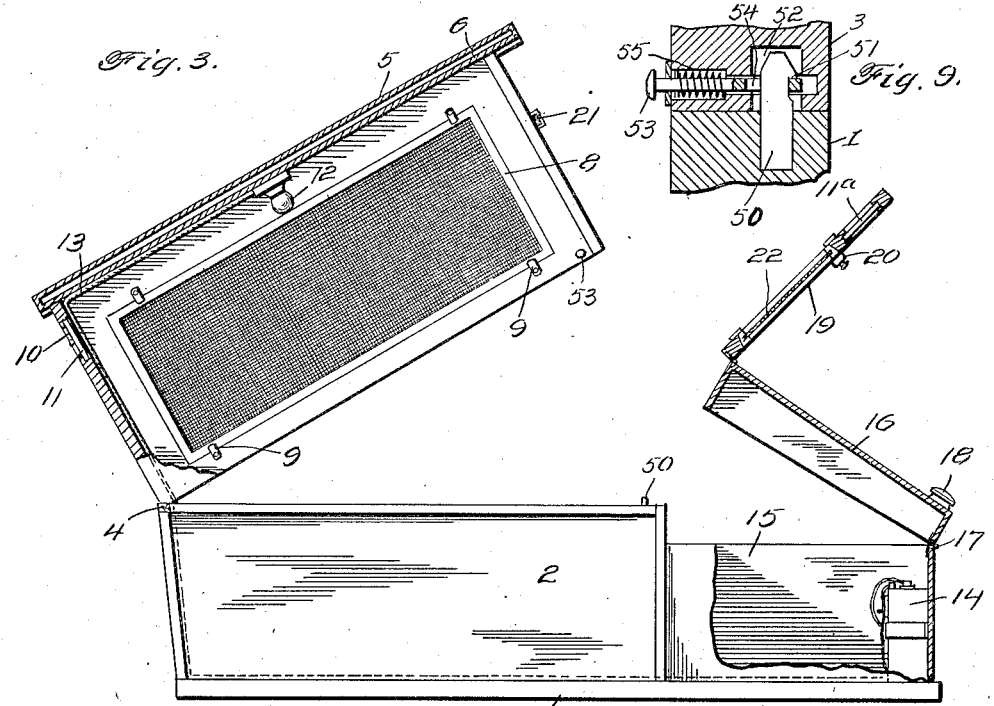
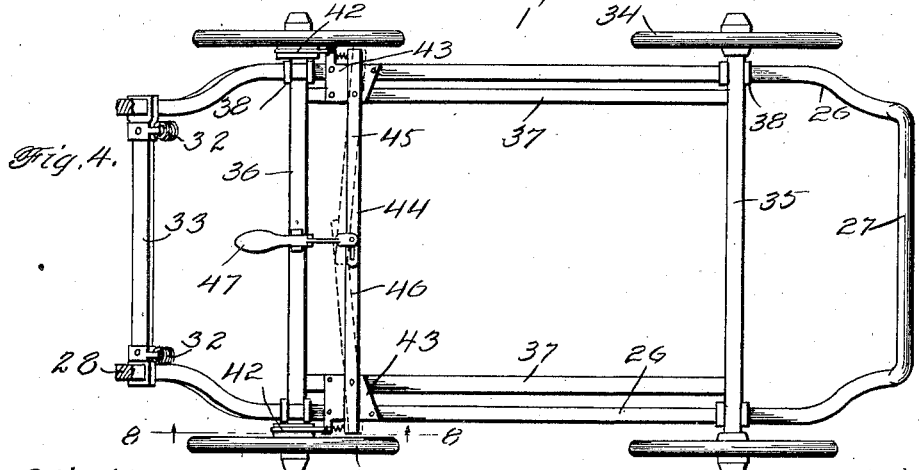
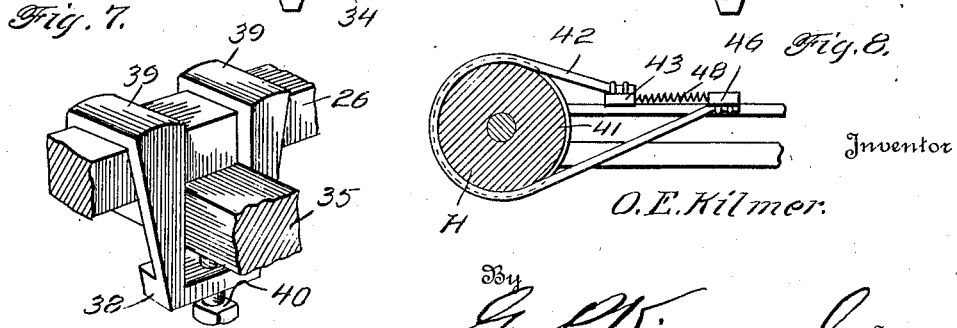
Inventor
O. E. Kilmer
By Geo. P. Kimmel, Attorney

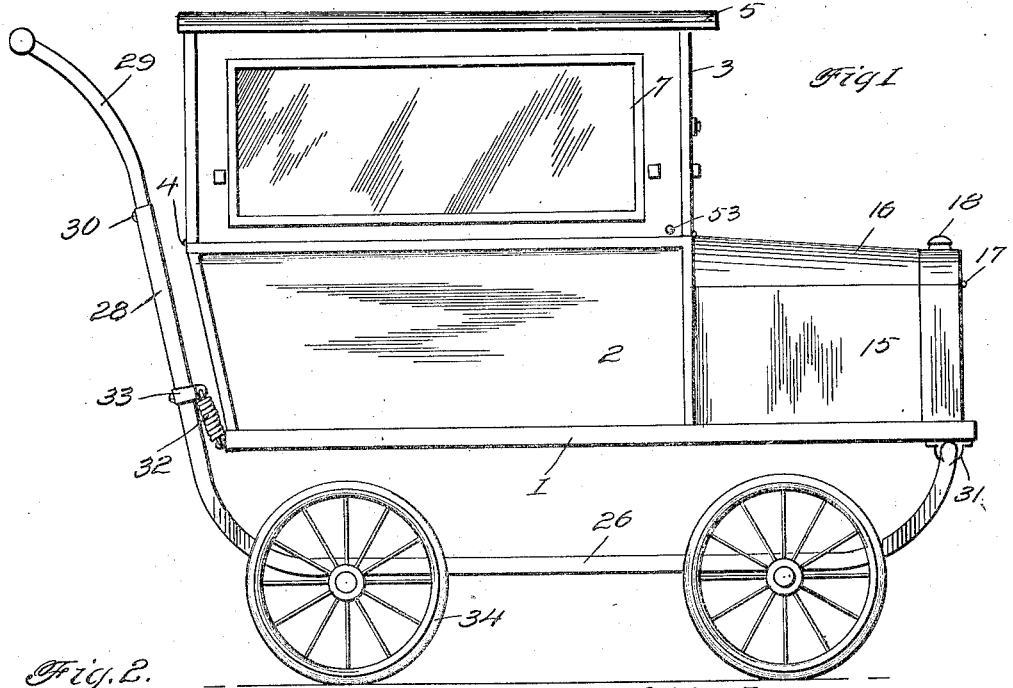
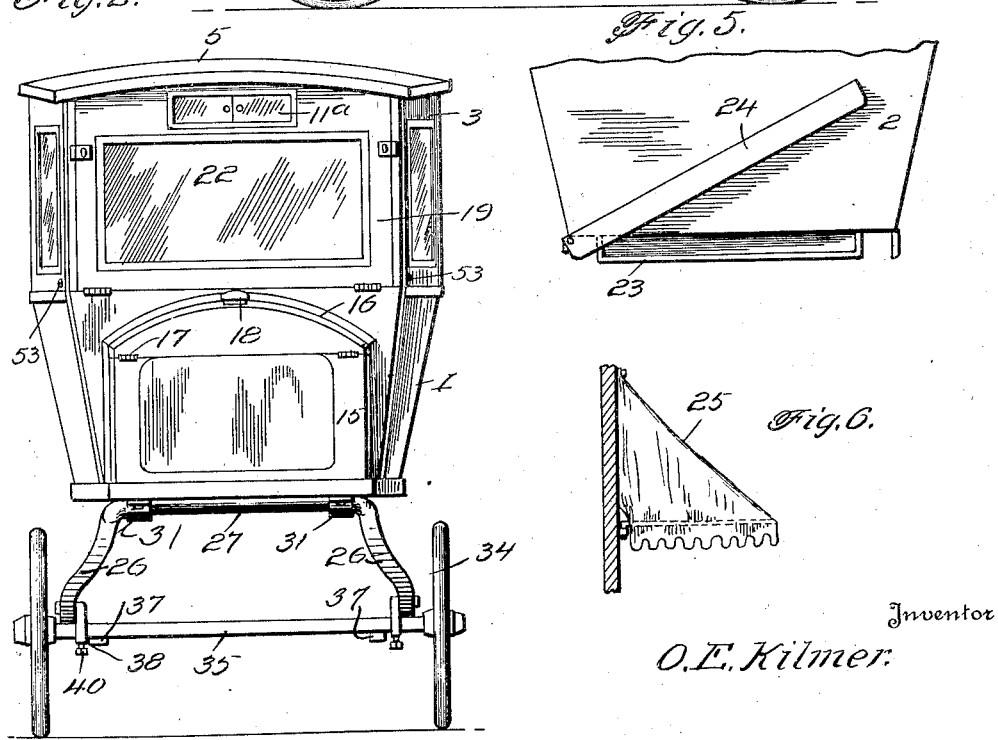

UNITED STATES PATENT OFFICE.

OPAL E. KILMER, OF VALPARAISO, INDIANA.

BABY-CARRIAGE.

1,401,085.  Specification of Letters Patent.  Patented Dec. 20, 1921.

Application filed February 28, 1921. Serial No. 448,428.

*To all whom it may concern:*

Be it known that I, OPAL E. KILMER, a citizen of the United States, residing at Valparaiso, in the county of Porter and State of Indiana, have invented certain new and useful Improvements in a Baby-Carriage, of which the following is a specification.

This inventon relates to a baby carriage or perambulator.

The object of the invention is to provide a vehicle of this character constructed so as to be propelled either on wheels or on runners thereby providing an all year vehicle and which when the wheels are removed may be used as a stationary container for the child.

Another object is to so construct a vehicle that the wheels may be quickly applied or removed with a minimum amount of labor and yet be securely connected when applied.

Another object is to so construct the body of a vehicle of this character to simulate a closed automobile, the sides of which have interchangeable panels of glass and screen wire to adapt it for use either in hot or cold weather, the screens protecting the child from insects.

Another object is to provide such a vehicle, the front portion of the body of which is so connected with the runners that it cannot lean to either side irrespective of the position of the child in said body, and the rear having a spring connection to permit cushioned vertical movement of said body.

Another object is to so construct such a vehicle that a main compartment for the child is provided having an auxiliary compartment at the front under the hood representing an engine which may be employed for carrying articles necessary for the child's use and also as a housing for the battery to be used in lighting the vehicle.

Another object is to provide a vehicle of this character, the body of which is divided into compartments having hinged tops to afford access to the compartments, one of which is designed to contain a child and the other the accessories or necessities to be used in connection with the child.

Another object is to provide a vehicle having a body of the character above set forth and equipped with a compartment for carrying the interchangeable panels and which while conveniently accessible is out of sight so as not to mar the appearance of the vehicle.

With these and other objects in view, the invention consists in certain novel features of construction as hereinafter shown and described, and specifically pointed out in the claims.

In the accompanying drawing:

Figure 1 represents a side elevation of a perambulator constructed in accordance with this invention.

Fig. 2 is a front elevation thereof.

Fig. 3 is a side elevation of the vehicle body removed from its running gear with the tops of the compartments in partially opened position and having parts broken away and in section for convenience in illustration.

Fig. 4 is a top plan view of the chassis of the vehicle with the handle bars shown in section.

Fig. 5 is a detail rear elevation of the vehicle body showing the panel containing compartment with the closure therefor open.

Fig. 6 is a detail sectional view of the body showing a part of the awning to be used in connection with the perambulator.

Fig. 7 is an enlarged detail perspective view showing the clamp for connecting the axle to the runner of the vehicle; and Fig. 8 is a detail section taken on the line 8—8 of Fig. 4 showing an end elevation of the brake to be used in connection with the vehicle.

Fig. 9 is a detail sectional view of the top securing latch.

In the embodiment illustrated the perambulator constituting the invention includes a body 1 constructed to simulate a closed automobile having a main compartment 2 equipped with a hinged top 3 opening upwardly and rearwardly the hinge being shown at 4, to afford access to the interior of the compartment for placing and removing the child and for rendering the necessary attentions thereto.

This top 3 has a double walled roof 5 with an air space 6 formed therein to protect the child from heat in the summer and to insure ample warmth in the winter.

This cover 3 has openings in its opposed side walls to receive interchangeable panels 7 and 8 the panels 7 being composed of glass and those 8 of screen wire so that in summer the panels 7 may be removed and the screen wire panels 8 substituted rendering the compartment comfortable and yet protecting the child against flies and other insects. Any suitable means may be provided for retaining these panels in operative position, pivoted buttons 9 being here shown for this purpose.

The rear wall of the top 3 is preferably provided near its roof 5, with an opening 10 equipped with a suitable closure 11, said closure being here shown in the form of slidable glass panes to provide light in the rear and also to permit the party pushing the perambulator to readily see the child at all times and if desired to open the panes and speak to it.

Similar panels 11a are arranged at the front of the top 3 as is shown clearly in Fig. 2. A dome light 12 is mounted on the interior of the roof 5 preferably at the center thereof and connected by a suitable wire 13 with the battery 14 located at the front of the vehicle in a compartment 15 arranged in front of the main compartment 2. By extending the electric light cable 13 around the rear of the top 3 and under the body thereof to the battery 14 at the front light may be provided at all times whether the top be opened or closed.

A latch for holding the top closed is shown in detail in Fig. 9 and is operable from outside to prevent the child from opening it. This latch comprises an upstanding pin 50 carried by the front of the body H which is provided with a notched beveled head 51 adapted to enter a socket 52 in the lower, front portion of top 3 when the latter is closed. A spring pressed button 53 has a shank mounted to slide transversely in the front end of top 3 and intersects socket 52 and lies in the path of pin 50. This shank is provided with an opening 54 through which the head 51 of said pin is designed to extend, the notch of said head interlockingly engaging one wall of said opening, and the spring 55 operating to hold said pin and button shank engaged. To open the top 3 the button is pressed inwardly thereby releasing pin 50 and the to may be raised.

The compartment 15 at the front of the vehicle is constructed to simulate a stream line automobile hood and is designed to contain the articles necessary to use in connection with the child as well as the battery 14. This compartment 15 has a hinged top 16 the hinge being provided at the front thereof as is shown at 17 so that the tops 16 and 3 will open in opposite directions as shown in Fig. 3. A cap 18 to simulate a radiator cap is shown carried by the front portion of the top 16 and a wind shield 19 is hingedly connected to the rear end of said top and designed to form a closure for the front end of top 3 in raised position, said shield 19 and the top having coöperating fastening elements shown at 20 and 21, respectively, which operate to hold the tops 16 and 3 connected and the wind shield 19 in raised operative position. This wind shield 19 may be of any desired construction having the usual glass pane 22 and in this instance the shield frame carries the sliding glass panels 11a which are arranged adjacent the top roof 5 of the member 3 when in operative position.

Arranged under the compartment 2 and opening at the rear thereof is a panel containing compartment 23 with a hinged or pivoted closure 24 so that the panels not in use may be stored in such compartment and protected against dirt and dust by said closure which is held in operative position by any suitable fastening means. If desired awnings shown at 25 in Fig. 6 may be mounted on both sides of the top 3 and at the front thereof any suitable supporting means being provided therefor.

The body 1 is permanently mounted on a pair of runners 26 which have upwardly curved front ends connected by a cross bar 27 and their rear ends curved upwardly and provided with handle extensions 28 with which telescopically engage extension handles 29 secured in adjusted position by set screws as 30.

The cross bar 27 which connects the front ends of the runners 26 is arranged transversely under the front portion of the body member 1 and is connected thereto by clips 31 shown clearly in Figs. 1 and 2. The rear end of the body 1 is connected with the upturned portions of the rear parts of the runners 26 by coiled springs 32 secured at their ends in any suitable manner to the body 1 and runner members, respectively, as is shown clearly in Fig. 1, in this instance clips 33 are provided for connecting said springs with the runner members. By securing the cross bar 27 to the front portion of the body 1 by the spaced clips 31 all possibility of the vehicle tipping to either side is prevented no mater in what position the child may be, the springs 32 affording a resilient connection at the rear between the body and the running gear formed by the runners 26 to permit the body to move vertically and the springs to absorb the shock incident to such movement.

Detachable supporting wheels 34 are detachably carried by the front and rear portions of the runners 26, the front wheels being mounted on an axle 35 and the rear wheels on a similar axle 36, said axles 35 and 36 being connected by side bars 37 forming a rigid substantially rectangular frame or chassis for the vehicle.

The front and rear axles 35 and 36 are detachably connected with the runners 26 at the front and rear portions thereof by clamps as 38, one of which is shown in detail in Fig. 7. Each of these clamps 38 comprises laterally spaced hook-like members 39 adapted to fit over one of the runners 26 as shown clearly in Fig. 7 and connected at their other ends by a cross bar or plate 40 between which and the runner 26 is designed to pass the axle 35 and which has a set screw 40 operating therethrough and engaged with the axle so that these screws 40 may be tightly clamped against the axle 35 thereby binding it to the runners 26 and when it is designed to remove the wheels and use the vehicle as a sled or sleigh these screws 40 are disengaged from the axle and the clamps removed from the runners, the wheel carried frame being set aside for future use. From the above it will be obvious that the wheel mounted frame may be readily attached to or disconnected from the runners 26 when desired by engaging or disengaging the clamps 38 with said runners and the axles carrying the wheels.

The rear wheels are provided with a suitable brake here shown in the form of a hub brake such as is used on automobiles to avoid wear on the tires. The hubs H of the rear wheels of the vehicle are provided on their inner ends with annular grooves 41 to receive brake bands 42 one end of each of which is fixedly secured to a laterally extending bracket 43 projecting outwardly from the frame members 37 and the other end of said band is secured to the outer end of a sectional brake lever 44 which extends transversely across the chassis of the vehicle, the sections 45 and 46 of this lever 44 extend transversely of the chassis and are pivotally connected at their inner ends with each other and with the inner end of a foot lever 47.

The lever sections 45 and 46 have a pin and slot connection so that when the foot pedal 47 is depressed the inner ends of said levers will be brought together and their outer ends moved forwardly against the tension of the springs 48 which connect the outer ends of said lever sections with the bracket 43 and thereby apply the brakes by tightening the band 42 on the hub.

From the above description it will be obvious that the top 3 which opens back provides the same space that any other top of a baby carriage or perambulator does and that the compartment 16 at the front of the vehicle which is provided with a hinged hood provides a waterproof container for carrying the necessities for the child using the perambulator and also a housing for the battery which supplies the electricity for the dome light, it being obvious of course that other lights may be used in connection with the perambulator if found desirable to do so.

What I claim is:

1. In a perambulator, a body, runners attached thereto, and a wheeled chassis having axles extending transversely under said runners in contact therewith, hangers detachably connecting said axles and runners, each of said hangers having hook-like laterally spaced members to fit over one of the runners with a cross bar connecting them to form a seat between it and the runner for the axle, and a set screw operating through said cross bar and engaging said axle to clampingly connect it with the runner.

2. A perambulator having a body including a main passenger compartment with a closed top hinged to open rearwardly, and an auxiliary compartment in front of said main compartment having a top hinged to open forwardly.

3. A perambulator having a body including a main passenger compartment with a closed top hinged to open rearwardly, and an auxiliary compartment in front of said main compartment having a top hinged to open forwardly, said front compartment top carrying a wind shield at its rear end, said wind shield and the front end of said main compartment top having coöperating fastening elements for detachably connecting them.

4. A perambulator body constructed to simulate a closed automobile body including a main compartment with an auxiliary compartment arranged in front thereof and having a top in the form of a stream line automobile hood, the main compartment having a closed top hingedly mounted thereon and provided with windows having interchangeable panels.

5. In a perambulator, a body, having a top provided with interchangeable panels, said body having a panel containing compartment under the bottom thereof and provided at its rear end with a pivoted closure equipped with suitable fastening means.

In testimony whereof, I affix my signature hereto.

OPAL E. KILMER.